United States Patent
Kim

(10) Patent No.: US 6,928,111 B2
(45) Date of Patent: Aug. 9, 2005

(54) METHOD AND APPARATUS FOR CONTROLLING EQUALIZER USING SYNC SIGNAL IN DIGITAL VESTIGIAL SIDEBAND SYSTEM

(75) Inventor: Ki-Bum Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 749 days.

(21) Appl. No.: 09/941,792

(22) Filed: Aug. 30, 2001

(65) Prior Publication Data

US 2002/0024995 A1 Feb. 28, 2002

(30) Foreign Application Priority Data

Aug. 31, 2000 (KR) ........................................ 2000-51083

(51) Int. Cl.[7] ............................ H03H 7/30; H04H 7/40; H04K 5/159
(52) U.S. Cl. ........................ 375/231; 375/229; 375/231; 348/607; 348/608; 708/300; 708/819
(58) Field of Search ................................ 348/607, 608; 375/231

(56) References Cited

U.S. PATENT DOCUMENTS 4,077,053 A * 2/1978 Ishiguro ................ 375/240.12
5,508,752 A * 4/1996 Kim et al. ................... 348/608
5,602,602 A * 2/1997 Hulyalkar ................... 348/607

* cited by examiner

Primary Examiner—Stephen Chin
Assistant Examiner—Erin File
(74) Attorney, Agent, or Firm—Sughrue Mion, PLLC

(57) ABSTRACT

An equalizer is controlled using a sync signal in a digital vestigial sideband system is provided, in which the sync signal is accurately separated even though a ghost having a short delay time and a large size is generated. A switching unit is provided between a matched filter and the equalizer, which selects one of two input signals according to rejection filter on/off control signals and separates a data segment sync signal and a data field sync signal from the selected input signal. A control signal is produced via the separated sync signal to control the equalizer to operate in one of a blind mode and a training sequence mode. Since the equalizer performs sync signal separation by using the ghost removed signal, a system initial operational time becomes shorter, and accurate sync signal separation is possible even if severe ghosts occur, to thereby improve degeneration of system performance greatly.

12 Claims, 3 Drawing Sheets

METHOD AND APPARATUS FOR CONTROLLING EQUALIZER USING SYNC SIGNAL IN DIGITAL VESTIGIAL SIDEBAND SYSTEM

BACKGROUND OF THE INVENTION

1. Field of the Invention

The present invention relates to a control of an equalizer in a digital vestigial sideband (VSB) system, and more particularly, to a method and apparatus for controlling an equalizer using a sync signal in a digital VSB system, in which the sync signal is accurately separated even though a ghost having a short delay time and a large size is generated, and then the equalizer is controlled with the separated sync signal, to thereby improve system performance greatly.

2. Description of the Related Art

A digital broadcasting which provides video and audio information for multimedia services is being commercialized worldwide. In digital broadcasting, it is very crucial to provide a modulation and demodulation technique which can assume a sufficient bit transfer rate in order to transmit video and audio signals through a broadcasting channel having a predetermined bandwidth. An American-oriented ground wave digital broadcasting receiver is a digital VSB system employing a VSB modulation and demodulation technique in order to assume a high bit transfer rate in a limited bandwidth. A conventional digital VSB system is shown in FIGS. 1 and 2.

FIG. 1 is a block diagram showing a conventional digital VSB system. The digital VSB system shown in FIG. 1 includes a tuner/IF (Intermediate Frequency) unit 1 selecting a RF (Radio Frequency) broadcasting signal of a desired channel from an incoming signal via an antenna. The tuner/IF unit 1 converts a selected RF broadcasting signal into an IF signal and outputs the converted result. An analog-to-digital (A/D) converter 2 converts an IF analog broadcasting signal into a digital form according to predetermined frequency clock oscillating in a voltage controlled crystal oscillator (VCXO) 3 and outputs the digital signal. The output signal of the A/D converter 2 is input to a carrier recovery unit 5 formed of a digital frequency phase locked loop (DFPLL) and an automatic gain control (AGC) unit 8. The DFPLL 5 which is a carrier recovery unit corrects frequency and phase errors of the input signal by using a pilot carrier signal, and then demodulates the corrected result into a baseband signal to recover the carrier. The carrier recovered signal is input to a matched filter 6. The matched filter 6 corrects the carrier recovered signal of the DFPLL 5 into a signal equal to a passband predetermined in a transmission end, and removes noise other than the passband, to thereby play a role of heighten an accuracy of signals. The output signal of the matched filter 6 is input to a symbol timing recovery unit 4, an NTSC rejection filter (NRF) 7, the AGC unit 8 and a sync signal detector 10. The NRF 7 receives the output signal of the matched filter 6 and removes an NTSC component from the received signal, to thereby prevent degeneration of HDTV signals due to an analog NTSC TV signal. The sync signal detector 10 detects a data segment sync signal from the output signal of the matched filter 6, and outputs the detected data segment sync signal to the symbol timing recovery unit 4, the AGC unit 8, an equalizer 9 and other blocks.

Meanwhile, the symbol timing recovery unit 4 recovers a symbol timing error from the output signal of the matched filter 6 in synchronization with the data segment sync signal detected in the sync signal detector 10. Here, the VCXO 3 receives the output signal of the symbol timing recovery unit 4, generates timing recovered symbol clock, and provides the timing recovered symbol clock to the A/D converter 2 as sampling clock. The equalizer 9 equalizes the output signal of the NRF 7 in synchronization with the data segment sync signal detected in the sync signal detector 10, to thereby remove ghost and inter-symbol interference due to a multi-path occurring during transmission of ground wave broadcasting. In general, in the case of a digital communications system, a transmission end transmits a transmission signal in which a predetermined training sequence is inserted at every interval, and a reception end detects and recognizes the training sequence to thereby identify the pattern of the transmitted signal and perform equalizing. In the case that the transmission end cannot transmit the training sequence together with the transmission signal, the reception end cannot see the pattern and state of the received signal. In this case, a blind equalizing should be performed.

The output signal of the equalizer 9 is input to a phase tracker loop (PTL) 11. The PTL 11 attempts phase tracking in order to compensate for a phase error. The output signal of the PTL 11 is input a R-S (Reed-Solomon) decoder 14 via a TCM (Trellis coded modulation) decoder 12 and a deinterleaver 13 in turn. The R-S decoder 14 decodes an input signal according to the R-S decoding and corrects an error generated in a channel. That is, the R-S decoder 14 corrects an error using redundancy data in the case that an error occurs in original data. The error-corrected data in the R-S decoder 14 is input to a derandomizer 15. The derandomizer 15 reproduces a data packet for packet decoding from the input data. That is, a part of packets selected from the data packets are reproduced into an audio part of a digital broadcasting program and the other selected packets are reproduced into a video part of the digital broadcasting program.

FIG. 2 is a block diagram showing another conventional digital VSB system. The configuration of the digital VSB system shown in FIG. 2 is same as that of the FIG. 1 conventional digital VSB system. In FIG. 2, a frequency phase locked loop (FPLL) 51 is used as a carrier recovery unit instead of the DFPLL 5 of FIG. 1, and is positioned in front of an A/D converter 2.

The digital VSB system of FIG. 2 carrier-recovers the output signal of a tuner/IF unit 1 via the FPLL 51 in analog form and outputs the carrier recovered signal to an A/D converter 2. The A/D converter 2 samples the carrier recovered reception signal according to predetermined frequency clock oscillating in a VCXO 3 and converts the sampled result in digital form, to then output the digitally converted result to a matched filter 6 and an AGC unit 8. Since operations of the other components are same as those of FIG. 1, the detailed description thereof will be omitted.

By the way, since the conventional digital VSB systems perform symbol timing recovery using a data segment sync signal, and thus the systems normally operate after performing sync signal separation, an initial operation time is longer. Also, since sync signal separation is performed in front of an equalizer and thus a ghost having a short delay time and a large size is generated, it is not possible to separate and detect an accurate sync signal due to an influence of the ghost, which results in degeneration of the system performance.

SUMMARY OF THE INVENTION

To solve the above problems, it is an object of the present invention to provide a method for performing a symbol timing recovery without using a sync signal, separating a sync signal in an equalizer by using a ghost-removed signal and accurately controlling an equalizer in a digital VSB system by using the separated sync signal, to thereby reduce an initial operational time of the system and enhance system performance.

It is another object of the present invention to provide an apparatus realizing an equalizer controlling method using a sync signal in a digital VSB system.

To accomplish the above object of the present invention, there is provided an equalizer controlling method using a sync signal in a digital vestigial sideband (VSB) system, the equalizer controlling method comprising the steps of: (a) selecting one of signals of the pre-end and post-end of the equalizer according to an input control signal; (b) separating a sync signal from the signal selected in step (a), and generating a control signal by the separated sync signal; (c) controlling the equalizer mode by the sync signal separated in step (b) and the control signal generated in step (b); and (d) performing equalizing corresponding to the controlled mode.

There is also provided an equalizer controlling apparatus using a sync signal in a digital vestigial sideband system (VSB), the equalizer controlling apparatus comprising: a recovery unit performing symbol timing and carrier recovery of digital received data; an equalizer performing equalizing with respect to the output signal of the recovery unit; a switching unit connected between the output end of the recovery unit and that of the equalizer, for selecting one of two output signals; a sync signal separator and control signal generator for separating a sync signal from the signal selected in the switching unit and generating various control signals according to the separated sync signal; and a mode controller for controlling a mode of the equalizer according to the control signals generated in the sync signal separator and control signal generator.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE INVENTION

A preferred embodiment of the present invention will be described with reference to the accompanying drawings.

Figure 1:
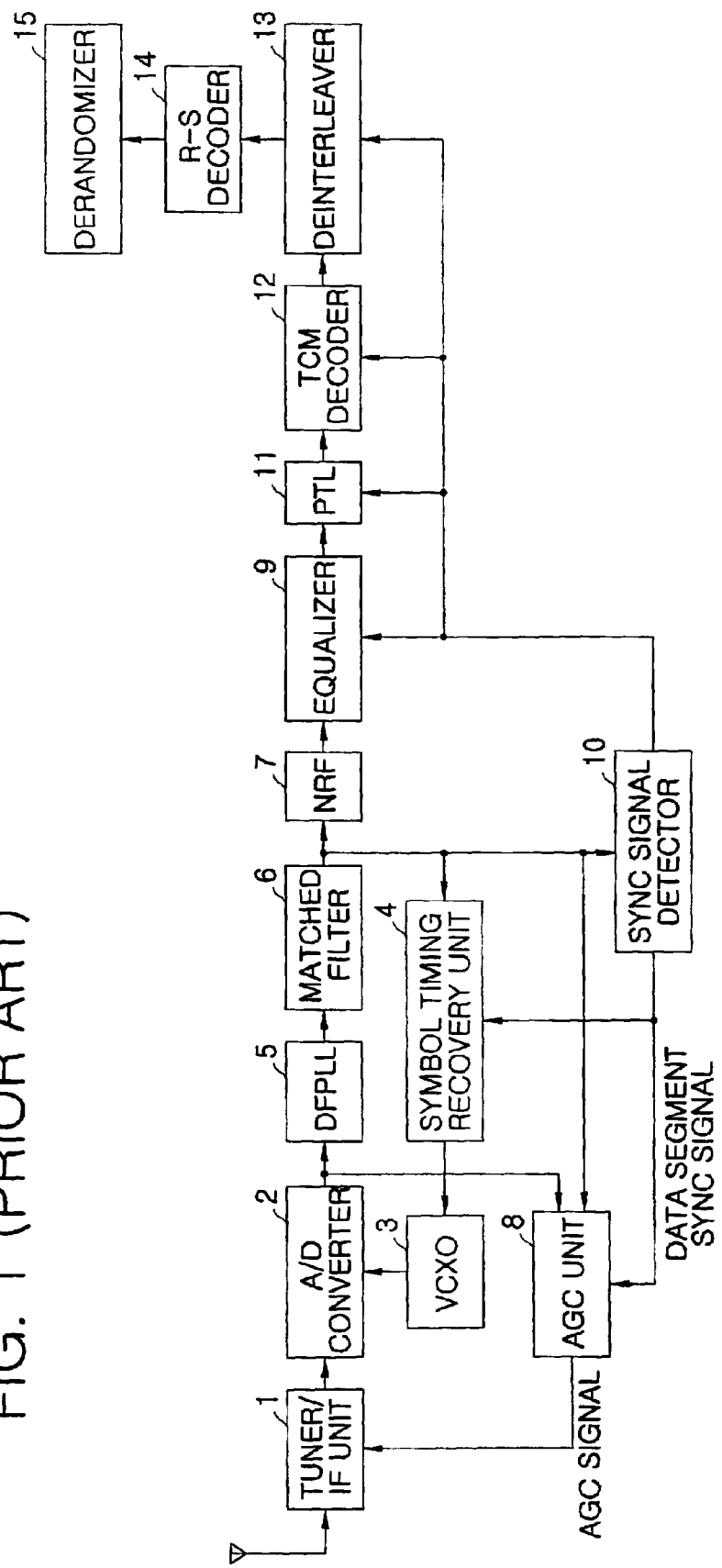
FIG. 1 is a block diagram showing a conventional digital VSB system.
Figure 2:
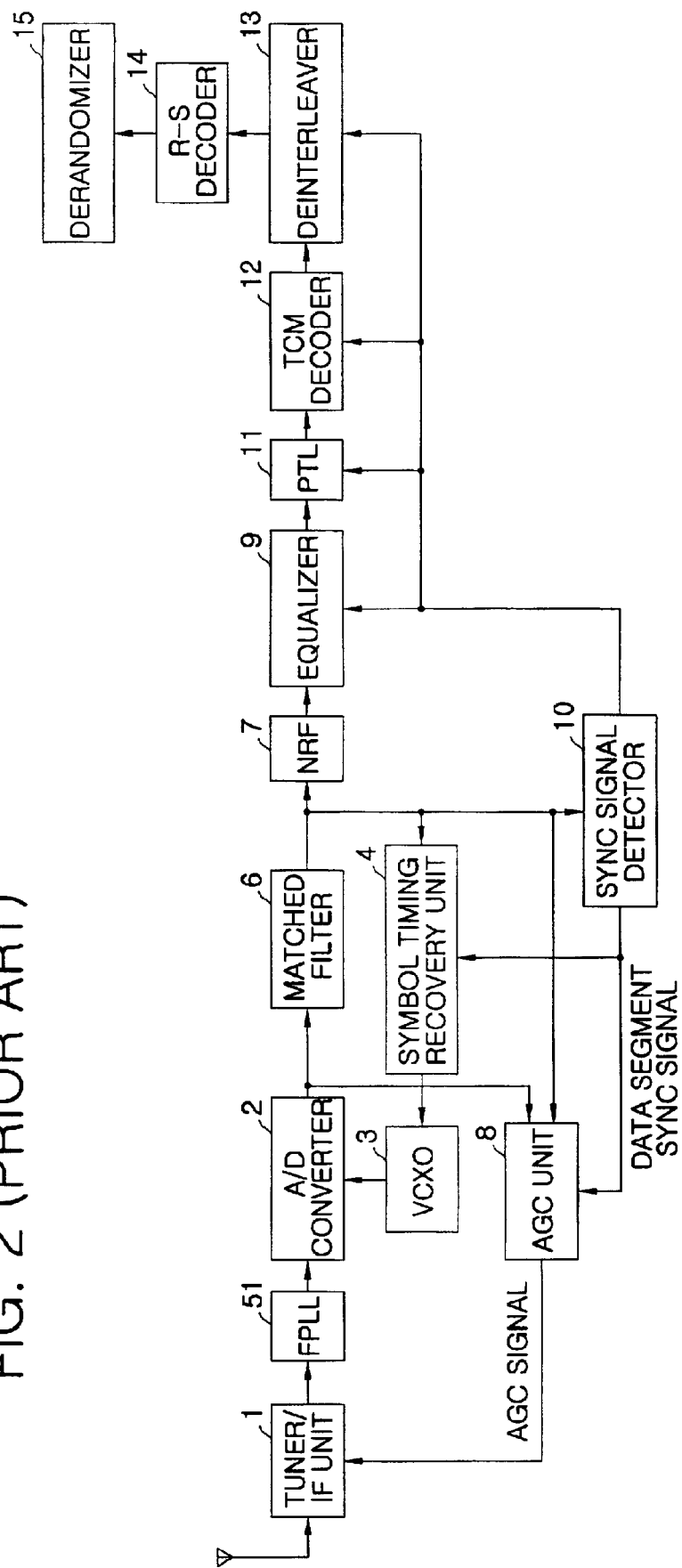
FIG. 2 is a block diagram showing another conventional digital VSB system.
Figure 3:
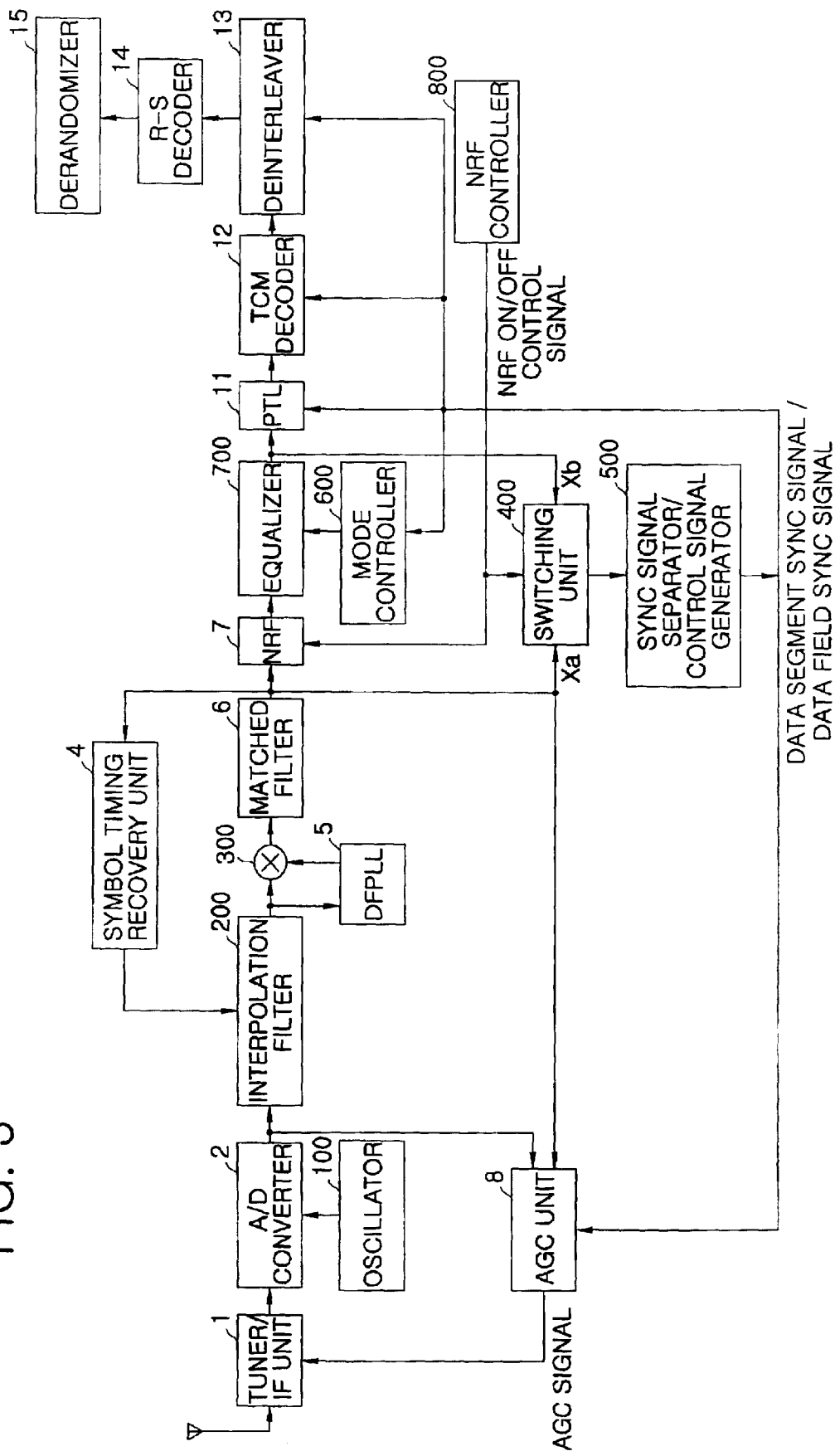
FIG. 3 is a block diagram showing a digital VSB system to which the present invention is adapted.

A digital vestigial sideband system (VSB) shown in FIG. 3 includes an oscillator 100 generating clock of a fixed frequency, an analog-to-digital (A/D) converter 2 for converting a received analog signal in digital form according to the fixed frequency clock generated in the oscillator 100, and an interpolation filter 200 connected between the A/D converter 2 and a matched filter 6, for interpolating the samples of the digital received data and adjusting a timing phase. Here, the interpolation filter 200 is controlled using the output of a symbol timing recovery unit 4. A carrier recovery unit 5 is configured by a digital frequency phase locked loop (DFPLL) which is a carrier recovery unit based on a digital signal processing and carrier-recovers the output signal of the interpolation filter 200 in digital form. The FIG. 3 system includes a multiplier 300 for multiplying the output of the interpolation filter 200 by the output of the DFPLL 5, to thereby be demodulated into a prior-to-being-VSB modulated original baseband signal, a switching unit 400 connected between the output end of a matched filter 6 and the output end of an equalizer 700, for selecting one of the two signals, and a sync signal separator and control signal generator 500 for separately detecting a sync signal from the signal selected from the switching unit 400 and generating an operational control signal of each component. A mode controller 600 controls the mode of the equalizer 700 according to the output signal of the sync signal separator and control signal generator 500. Meanwhile, the FIG. 3 system includes an NTSC rejection filter (NRF) controller 800 which controls the on and off operations of an NRF 7 and the switching unit 400. Here, the same elements as those of the conventional configuration are denoted as the same reference numeral. Also, since the other elements which are positioned in the post-end of the equalizer 700 are same as those of the conventional configuration, the detailed description will be omitted. The operations of the sync signal separation and equalizer control in the digital VSB system of FIG. 3 will follow in more detail.

In FIG. 3, the tuner/IF unit 1 selects a RF broadcasting signal of a desired channel from an incoming signal via an antenna. The tuner/IF unit 1 converts the selected RF VSB broadcasting signal into an IF form and outputs the converted result to an analog-to-digital (A/D) converter 2. The A/D converter 2 converts the input IF analog signal into a digital form by using fixed frequency clock oscillating in the oscillator 100. The digital received data output from the A/D converter 2 is input to the interpolation filter 200 and the AGC unit 8, respectively. The interpolation filter 200 interpolates the input digital received data under the control of the symbol timing recovery unit 4, and outputs the symbol timing recovered reception data at the same position as an original symbol position. That is, the interpolation filter 200 interpolation-filters the input digital reception data and inserts any data having an intermediate value into every position between the samples by the number of filter coefficients. The interpolation filter 200 selects data having one of the intermediate values inserted into every position between the samples according to the output signal of the symbol timing recovery unit 4 and outputs the selected data. The data output from the interpolation filter 200 is input to the DFPLL 5 and the multiplier 300, respectively in order to recover a carrier. The DFPLL 5 which is a carrier recovery unit receives the data output from the interpolation filter 200 and judges whether a carrier signal of a desired channel to be received is accurately recovered, to thereby output frequency and phase error correction values according to the judgement result. That is, the carrier recovery unit 5 transmits the frequency and phase error corrected information of the carrier to the multiplier 300 using a pilot carrier signal. The multiplier 300 multiplies the data output from the interpolation filter 200 by the error corrected information of the DFPLL 5. As a result, the modulation signal output from the interpolation filter 200 can be demodulated into an original baseband signal accurately. The matched filter 6 corrects the outputs of the multiplier 300 into a signal which is same as a passband predetermined originally at a transmission end, and removes noise other than the passband, to thereby play a role of heightening an accuracy of signals. The output signal of the matched filter 6 is input to the symbol timing recovery unit 4, the NRF 7, the AGC unit 8, and the switching unit 400. The symbol timing recovery unit 4 detects a timing error of the symbol generated during transmission from the transmission end, and modifies the error detected result, to then be output to the interpolation filter 200. Thus, the interpolation filter 200 determines an accurate sampling position with respect to the signal transmitted from the transmission end, by using the information output from the symbol timing recovery unit 4. Meanwhile, the NRF 7 performs filtering of the output signal of the matched filter 6 for removing NTSC components according to an NRF on/off control signal applied from the NRF controller 800. That is, the NRF 7 performs a filtering operation if a NRF-on control signal is applied and outputs the signal to the equalizer 700 without performing a filtering operation if a NRF-off control signal is applied. The NRF-on/off control signals are also input to the switching unit 400. The switching unit 400 receives the output signal Xa of the matched filter 6 and the output signal Xb of the equalizer 9, and selects one of the two input signals Xa and Xb according to the NRF-on/off control signals applied from the NRF controller 800 and outputs the selected result to the sync signal separator and control signal generator 500. That is, the switching unit 400 selects the output signal Xa of the matched filter 6, if a NRF-on control signal is applied, and selects the output signal Xb of the equalizer 700 if a NRF-off control signal is input. Since the level and pattern of the signal vary at the state where the NRF 7 operates, a sync signal cannot be separated by using the output signal of the NRF 7. Thus, a sync signal can be separated by using the output signal Xa of the matched filter 6 which is positioned in the pre-end of the NRF 7 except for the equalizer 700 at the NRF-on state. The sync signal separator and control signal generator 500 separates and detects a data segment sync signal and a data field sync signal from the signal selected in the switching unit 400 and generates various control signals which are necessary in other elements by using the two sync signals. The output signal of the sync signal separator and control signal generator 500 is input to the mode controller 600, the AGC unit 8 and the other blocks. The mode controller 600 controls the mode of the equalizer 700 by using the information output from the sync signal separator and control signal generator 500. That is, the mode controller 600 controls the equalizer 700 to operate at a blind mode in the case of an initial system operation before a sync signal is separated, a Doppler ghost generation in which the size and phase of the ghost severely vary, and an unstable sync signal separation, and controls the equalizer 700 to operate at a training sequence mode. The equalizer 700 performs equalizing with respect to the output signal of the NRF 7 so as to match the mode controlled by the mode controller 600.

In this embodiment, the mode control of the equalizer 700 is automatically performed in the system by using the information output from the sync signal separator and control signal generator 500. However, the mode control can be controlled as necessary externally.

As described above, the equalizer controlling method and apparatus using a sync signal in a digital VSB system according to the present invention performs a symbol timing recovery without using a sync signal, performs sync signal separation from the output signal of the equalizer, and controls the equalizer with the separated sync signal. Accordingly, the system initial operational time becomes very short. Also, even if a severe ghost occurs, it is possible to separate an accurate sync signal from the whole signal, to thereby enhance system performance greatly.

What is claimed is:

1. An equalizer controlling method using a sync signal in a digital vestigial sideband (VSB) system, the equalizer controlling method comprising the steps of:
   (a) selecting one of a pre-end signal and a post-end signal of the equalizer according to an input control signal;
   (b) separating a sync signal from the signal selected in step (a), and generating a control signal by the separated sync signal;
   (c) controlling an equalizer mode by the sync signal separated in step (b) and the control signal generated in step (b); and
   (d) performing equalizing corresponding to the controlled mode.

2. The equalizer controlling method of claim 1, wherein said step (a) comprising the sub-steps of first performing filtering for removing National Television System Committee (NTSC) components from the pre-end signal of the equalizer; and then selecting one of the pre-end signal and the post-end signal of the equalizer according to an on/off control signal for controlling the NTSC rejection filtering operation.

3. The equalizer controlling method of claim 1, wherein said step (a) comprising the sub-steps of:
   (a1) sampling a received ground wave broadcasting signal according to a fixed frequency clock and converting the sampled result to digital form;
   (a2) interpolating and filtering the digital converted broadcasting signal of sub-step (at) to thereby generate an intermediate value corresponding to each value positioned between the samples, and outputting appropriate values among the intermediate values positioned between the samples according to a symbol timing recovered signal;
   (a3) correcting the frequency and phase errors of a carrier in the output signal of sub-step (a2), and converting the frequency and phase error corrected signal into a baseband signal using the error corrected carrier;
   (a4) limiting a band of a baseband signal of sub-step (a3) and performing symbol timing recovery from the band limited signal; and
   (a5) selecting one of the band limited signal of sub-step (a4) and the output signal of the equalizer, and outputting the selected signal.

4. The equalizer controlling method of claim 1, wherein said equalizer mode is selected from a plurality of equalizer modes, including at least a blind mode and a training mode for the equalizer.

5. An equalizer controlling apparatus using a sync signal in a digital vestigial sideband system (VSB), the equalizer controlling apparatus comprising:
   a recovery unit performing symbol timing and carrier recovery of digital received data;
   an equalizer performing equalizing with respect to an output signal of the recovery unit;
   a switching unit connected between an output end of the recovery unit and an output end of the equalizer, for selecting one of two output signals;
   a sync signal separator and control signal generator for separating a sync signal from the signal selected in the switching unit and generating various control signals according to the separated sync signal; and
   a mode controller for controlling a mode of the equalizer according to the control signals generated in the sync signal separator and control signal generator.

6. The equalizer controlling apparatus of claim 5, wherein said recovery unit comprises:

an oscillator for generating a fixed frequency clock;

an analog-to-digital (A/D) convener for converting a received analog signal into a digital form according to the fixed frequency clock generated in the oscillator;

an interpolation filter for generating intermediate values corresponding to signals positioned between the samples of the digital reception data applied from the A/D converter and outputting appropriate values among the intermediate values positioned between the samples under the control of the symbol timing recovery unit;

a carrier recovery unit for correcting frequency and phase errors of the output signal of the interpolation filter and recovering a carrier;

a multiplier for multiplying the output of the carrier recovery unit by the output of the interpolation filter;

a matched filter for signal-matching an output signal of the multiplier; and a symbol timing recovery unit for receiving the output signal of the matched filter and performing the symbol timing recovery, to thereby control the interpolation filter.

7. The equalizer controlling apparatus of claim 6, further comprising a NTSC rejection filter (NRF) connected between the matched filter and the equalizer, for performing filtering in order to remove NTSC components from the output signal of the matched filter.

8. The equalizer controlling apparatus of claim 7, further comprising a NRF controller for controlling the NRF to be turned on/off.

9. The equalizer controlling apparatus of claim 8, wherein said switching unit receives the output signals of the matched filter and the equalizer and selects one of two input signals according to the NRF on/off control signals applied from the NRF controller to then be output to the sync signal separator and control signal generator.

10. The equalizer controlling apparatus of claim 9, wherein said switching unit selects the output signal of the matched filter when the NRF is operation, and selects the output signal of the equalizer when the NRF is not operating.

11. The equalizer controlling apparatus of claim 10, wherein said sync signal separator and control signal generator separates a data segment sync signal and a data field sync signal from the signal selected from the switching unit.

12. The equalizer controlling apparatus of claim 5, wherein said mode controller controls the equalizer to operate in a blind mode when a ghost generation is determined or when a sync signal separation is unstable is determined from the control signals produced from the sync signal separator and control signal generator, and to operate in a training sequence mode in the other cases.

* * * * *